United States Patent [19]

Oen et al.

[11] Patent Number: 4,695,935
[45] Date of Patent: Sep. 22, 1987

[54] POWER SUPPLY

[75] Inventors: Sverre Oen, Oslo; Dag Poppe, Kolsas; Sverre N. Tronsli, Nittedal, all of Norway

[73] Assignee: Alcatel N.V., Amsterdam, Netherlands

[21] Appl. No.: 879,686

[22] Filed: Jun. 27, 1986

[30] Foreign Application Priority Data

Jun. 28, 1985 [NO] Norway ................................. 852598

[51] Int. Cl.⁴ ........................................... H02M 3/335
[52] U.S. Cl. ....................................... 363/21; 363/71; 363/26; 323/272; 323/906
[58] Field of Search ..................... 363/20–26, 363/56, 71–72, 97; 323/271, 272, 350–351, 906

[56] References Cited

U.S. PATENT DOCUMENTS

| | | | |
|---|---|---|---|
| 3,348,120 | 10/1967 | Geyger | 363/22 |
| 3,566,143 | 2/1971 | Paine | 323/906 X |
| 3,974,437 | 8/1976 | Patel et al. | 363/71 |
| 4,134,057 | 1/1979 | Portmann | 323/906 X |

FOREIGN PATENT DOCUMENTS 2722339  11/1978  Fed. Rep. of Germany ........ 363/21

Primary Examiner—Peter S. Wong
Attorney, Agent, or Firm—Spencer & Frank

[57] ABSTRACT

A power supply for converting a low DC voltage, in particular a DC voltage delivered from a sea water galvanic cell (or solar cell), into a DC voltage useful for normal electronic equipment includes a number of MOS-FET transistors connected in parallel to an output transformer. The transformer has a number of primary windings distributed on a toroidal ferrite core so as to interact with the secondary winding of the transformer.

8 Claims, 8 Drawing Figures

POWER SUPPLY

BACKGROUND OF THE INVENTION

The present invention relates to power supplies for delivering DC voltages which are useful for normal electronic equipment such as voltages in the order of 10-40 Volts. The power supply concerned includes a MOS-FET transistor circuit arrangement operating as a DC/DC converter. Such power supplies are for instance described in MOS Power Applications Handbook from Siliconix TK 7821.95.M67 1984, but they are not suitable for being energized with voltages lower than 5 Volts.

The characteristic features of a MOS-FET transistor are that it has a very low internal resistance in the on-condition (a drain-source resistance <15 milliohms). When the term MOS-FET is used in the present specification and claims, it includes all types of transistors having such characteristics.

Power supplies operating from voltages lower than 5 Volts may have many applications in portable equipment and in other apparatus in areas where ordinary power lines are not available. When the power generation is based on supply of voltage from a sea or salt water galvanic cell, possible user groups and applications are: rescue equipment, privately owned boats and yachts, off-shore industry, fishing industry, lighthouse services, meteorology, naval defense, telecommunication.

Salt water galvanic cells are known from for instance U.S. Pat. No. 3,401,063. This patent mentions that DC/DC or DC/AC converters, known from U.S. Pat. Nos. 2,849,615 and 2,987,665, are suitable for producing a desired voltage output. Experiments have, however, shown that the efficiency of these converters is very low.

The main object of the present invention is in general to provide power supplies which are more efficient than known power supplies. The object of the invention is in particular to provide efficient power supplies which include use of sea water galvanic cells.

There are several features that are required from a power supply which is to be used in sea water.

The converter must start functioning when its input voltage rises to a valve corresponding to the low voltages usually delivered by a sea water galvanic cell, i.e. voltages lower than 5 Volts, usually lower than 0.6 Volt.

It should preferably not be necessary to use any auxiliary voltage source to start the converter. In some applications, it would, however, be desirable to have this possibility.

The converter should have the highest possible efficiency.

The converter should preferably be voltage controlled. This means that when the load does not require any current, the converter should draw the least possible current from the low voltage source.

The converter should be capable of withstanding rough handling and tough environments like salt water, water pressure and so on according to specifications.

The converter should have a simple construction in order to obtain a high MTBF.

The converter should be able to withstand shortcircuits on the output or reversed polarity of the input terminals.

The converter should also have the possibility of being current controlled. This means that the converter should be able to deliver substantially constant current independent of load and input voltage.

The converter must be capable of being stopped or started with predetermined external signals.

The converter must be capable of being constructed by modules which may be interconnected to provide increased output.

Most of these requirements are valid for any application of the power supply.

OBJECTS OF THE INVENTION

The power supply of the present invention will be capable of taking over the functions of lithium batteries which are now commonly used in light and emergency radiotransmitters on lifevest and liferafts
  float free beacons
  dynamic positioning devices
  hydro-accoustic transmitters
  pressure and temperature sensors in offshore installations
  seismic measuring devices
  net indicator lights on fishing equipment
  buoys with sensors and radiotransmitters for meteorological purposes.

It may also take over the power part in offshore installations where the equipment installed for instance on the ocean floor now get electric power from the rig generator via cables or umbilicals.

It may in many instances substitute oil and gas supplies which are used for running lighthouses, lights and lanterns. Furtermore, it may be used to supply on site power for submarine detection and alarm systems and for fiber optic repeater stations. Such subseas installations are now supplied with electrical power from the mainland, from an oil rig, or in some cases power is achieved by using some type of dry cells which needs relatively frequent and costly replacement.

Other applications could be mentioned such as sources for charging of batteries in small boats and yachts, illuminated fishing bait, accoustic sound fishing bait, electrical field fence or guidance for fish, or automated fish capturing.

When used in portable equipment the power supply of the present invention may be a substitute for the usual pack of 4-6 or more battery cells. In this version of the power supply only one primary or secondary cell will be used to feed the converter. The converter may of course be built into the portable equipment, so that the user only has to exchange one cell for a fresh one instead of having to exchange a whole pack of cells each time. In this way, the battery capacity within portable equipment can be used to its end and not be limited by weak individual cells in the normal cell-stacks.

In solar cell panels the power supply of the present invention may be used in connection with a single solar cell. (In a solar panel with a number of cells in series there will nearly always be some weak cells).

The power supply of the present invention largely satisfies the following features which are important to users:

Indefinite storage
Long life
high level of reliability
compatibility with existing equipment
ease of installing
low maintenance costs (the cell only is replaced)
low initial costs.

SUMMARY OF THE INVENTION

These objects and others which will become obvious hereinafter are accomplished by the present invention which provides a power supply comprising a DC/DC converter including at least two transistors connected in parallel, each having low drain-source resistance, a control circuit connected to each of the transistors such that the transistors are controlled in parallel by a common control signal, each of the transistors having output terminals, and a transformer coupler including primary windings constituted by a plurality of windings interconnected with the output terminals.

BRIEF DESCRIPTION OF THE DRAWING

Above mentioned objects and features of the present invention will clearly appear from the following detailed description of embodiments of the invention taken in conjunction with the drawings, where.

DETAILED DESCRIPTION OF THE PREFERRED EMBODIMENT

Figure 1:
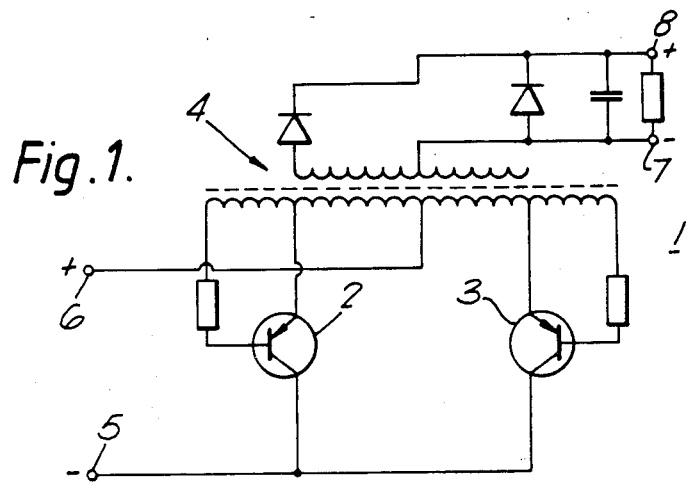
FIG. 1 shows a germanium transistor converter.

FIG. 1 illustrates a self-ocillating converter 1 using germanium transistors 2, 3. Such transistors are used because they are capable of being operated by DC voltages lower than 1 Volt. The low input voltage is applied to terminals 5, 6.

The principle of the converter is that the transformer 4 goes into saturation and alternatively switches transistors 2 and 3, off and on. The alternating voltage obtained across the transformer 4 is transformed to a higher value and rectified. The higher DC output voltage appears on terminals 7, 8.

Such a circuit was constructed using germanium transistors having a low forward voltage rating. In the on-condition the voltage across the transistor was 0.1 Volts at 8 Amperes.

This seemed to be a converter having several advantages:

The construction was simple, cheap and robust.
It started easily by itself on an input voltage as low as 0.2 Volts.
It withstood shortcircuits on the output terminals and reversed polarity on the input terminals.
The output voltage was easily filtered because the output consisted of 180° pulses.

However, this converter also has severe drawbacks, such as:

The output voltage is not controllable without introdution of an auxilliary regulator in the output circuit.
The efficiency was low, especially with small loads.
It cannot easily be realized in modules which can be interconnected in parallel.

This type of converter is suitable when the output power is allowed to be low, such as 1 Watt or lower. It is preferably used as driver supply for larger converters, and it may be used where there are no particular requirements for efficiency.

Figure 2:
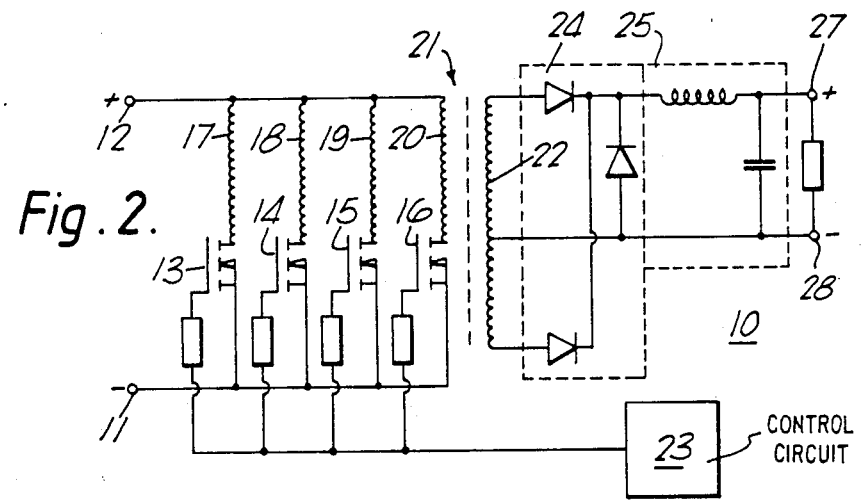
FIG. 2 shows a MOS-FET DC-DC converter.

The principles of the basic component of the present invention will be explained in connection with FIG. 2. FIG. 2 shows a DC/DC converter 10 working according to the forward principle. The output from a low voltage source is applied to input terminals 11, 12. A number of MOS-FET transistors 13, 14, 15, 16 are as shown connected in parallel. Each of the transistors is connected in series with an individual winding 17, 18, 19, 20 on the primary side of a transformer 21. The primary side of the transformer 21 is therefore constituted by a number of parallel circuits. The transformer 21 should preferably have a toroidal ferrite core and the individual primary windings 17, 18, 19, 20 should preferably be distributed around the toroid. This is done in order to obtain a low leakage inductance and a large copper cross section on the primary side of the transformer. The primary windings should be arranged on the toroid so as to interact with different parts of a secondary winding 22. This is schematically illustrated in connection with FIG. 7.

Whereas each of the transistors 13, 14, 15, 16 is connected to its individual primary winding 17, 18, 19, 20, all may be controlled from a common control circuit 23. The control circuit 23 may include conventional components like amplifiers, oscillators and pulsewidth modulators for providing a desirable duty cycle control of the MOS-FET transistors. One example of a control circuit which may be used is described in Philips, Signetics handbook May 1982, Type NE/SE 5561. This will be described in more detail in connection with FIG. 5. (Other control circuits which may be used are: Siliconix PWM 125, Unitrode UC 1524A, 2524A, 3524A, National Semiconductor LH1605, Motorola TDA 1085A, B, Spraque ULN-8160A, 8160R, ULS 8160R, Texas instrument TL 497A, Siemens TDA 4700). This control component is shown as a box only in FIG. 2.

By defining the duty cycle of the converter 10, the output voltage may be controlled. This voltage may e.g. be kept constant independently of the input voltage and load conditions.

The voltage output on the secondary side of the transformer is rectified in a rectifier 24 and filtered in a filter 25, to appear on terminals 27, 28 so that it may be used for charging of batteries or for supplying energy to other electronic equipments.

The converter circuit of FIG. 2 has been proven to have several advantages:

the output voltage is easily controlled to a desired value,
by using MOS-FET transistors the efficiency may easily be increased. The output power is dependent on the number of transistors which are connected in parallel.
the control power required is low.
the converter is easily turned on and off with external control signals.

the converter may be given a modular design so as to deliver required power by simply adding modules.

Figure 3:
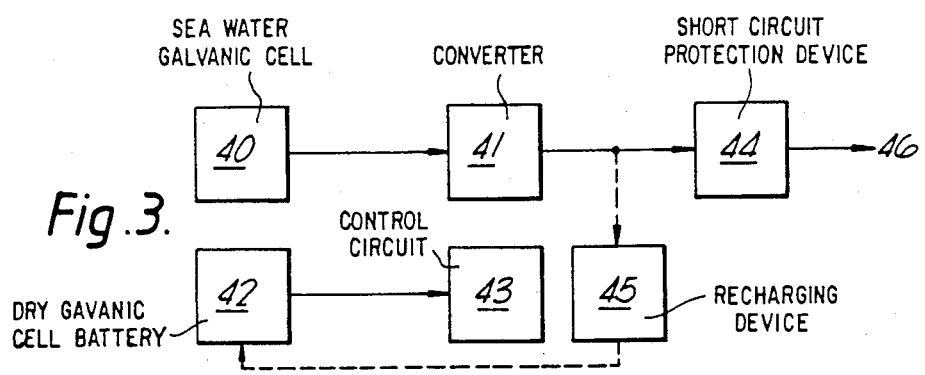
FIG. 3 shows in block form a power supply energized from e.g., a sea water galvanic cell.

In FIG. 3 a sea (or salt) water galvanic cell 40, (a solar cell or a similar primary cell) having a low DC voltage output is connected to a converter 41 which is similar to the converter shown in FIG. 2. A dry galvanic cell battery 42 is used as driver for a control circuit 43 for the converter 41. The control circuit 43 could be similar to the control circuit 23 of FIG. 2 and will be described in some detail later. The control circuit 43 requires a driving voltage in the order of 8 to 20 Volts. This version of the power supply works as follows: If primary cells are used in the battery 42 the power supply will work as long as the cell 40 delivers the desired voltage. However, if there is a short circuit on the output of the power supply the converter will be shut off and it can only be started again if the primary battery 42 is not discharged. A remedy against this risk is to include a short circuit protection device 44 in the output circuit. Another remedy is to use rechargable secondary cells in the battery 42 and to use a recharging device 45 for keeping the battery charged at all times. The desired DC output signal is taken from terminal 46.

Figure 4:
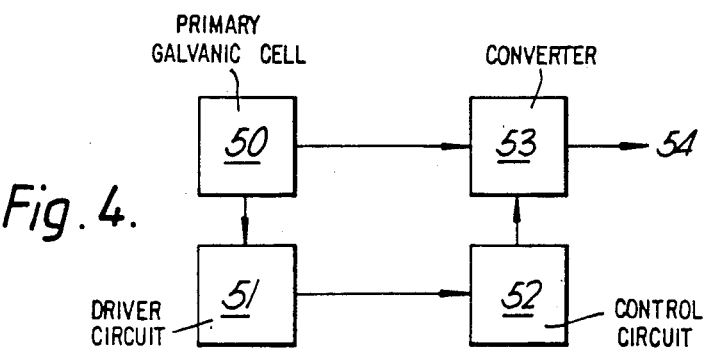
FIG. 4 shows in block form a preferred embodiment of the invention.

In FIG. 4 is illustrated a circuit arrangement similar to that of FIG. 3, where a primary galvanic cell 50 consisting of a sea water galvanic cell, a solar cell or the like which is capable of delivering a continuous low DC voltage, is used to operate a germanium driver circuit 51 for a control circuit 52. A germanium transistor suitable for this purpose is MOTOROLA 2N 1549A - 2N 1560A. The circuits 51 and 52 as well as a converter 53 may correspond to the circuits 1 (FIG. 1), 43 (FIG. 3) and 41 (FIG. 3) respectively. The block circuit diagram of FIG. 4 will be described in more detail in connection with FIG. 5. The desired output voltage is taken from terminal 54.

Figure 5:
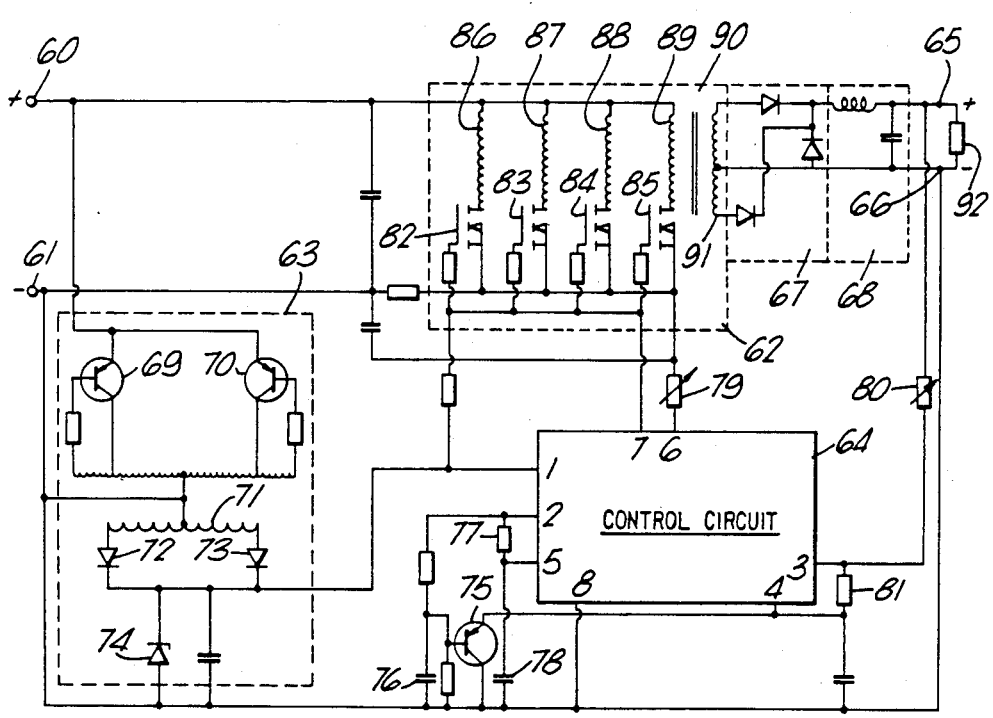
FIG. 5 shows in more detail the embodiment of FIG. 4.

In FIG. 5 there is a detailed illustration of a power supply according to the present invention. A sea water galvanic cell (solar cell or similar cell) not shown is connected to input terminals 60, 61. The low voltage DC signal is as shown applied to a MOS-FET transistor converter 62 and to a germanium transistor oscillator 63. A control circuit 64 is connected between the oscillator 63 and the converter 62 with feedback from the output terminals 65, 66. A rectifier 67 and a filter 68 are shown connected to the output from the converter 62.

The oscillator 63 is similar to the oscillator 1 in FIG. 1. It consists of two transistor circuits 69 and 70 and a transformer 71. Its rectified output from diodes 72, 73 is stabilized at around 15 Volts by a Zener diode 74 to provide the driving voltage for the control circuit 64 on its pin (1). The oscillator 63 may be designed in many ways as long as it is capable of being driven by the low DC voltage provided.

The control circuit 64 shown may mainly be constituted by a "Switched Mode Power Supply Controller NE/SE 5561" from Philips Signetics as mentioned previously.

We shall give a short description of its operation.

The transistor 75 is a combination slow start and maximum duty cycle limit transistor. When power is first applied to the circuit, capacitor 76 in its discharged state begins to charge toward the divider voltage Vd. This voltage Vd plus the base-emitter voltage of transistor 75 control the voltage on pin 4 (the error amplifier output) on the block 64, causing the duty cycle to be limited initially to Do, then to gradually approach its normal operating range D. The base divider is fed from the output from terminal 2 which is normally 8.2 Volts.

The output from terminal 7 to the gate electrodes of the MOS-FET transistors 82–85 is a square wave of variable duty cycle as determined by load demands. The internal transistor is open collector and must have a pull-up resistance, in this connection the gate resistors of the MOS-FET transistors. The duty cycle D is a fraction between 0 and 1. The actual on-time is proportional then to $D \times T$, where T is the period of the free-running frequency of the sawtooth generator internal in the NE 5561. The frequency is set by the RC combination resistor 77, capacitor 78 with charging current supplied from terminal 2. The stabilizing effect of the internal Zener supply gives a constant frequency. The sawtooth waveform is related to the duty cycle.

The MOS-FET transistors 82–85 are switched on during the staturated portion from pin 7 of NE 5561, termed D and is switched off during the remainder of the cycle (1−D).

Pin 6 on the NE 5561 operates an overcurrent protective feature which resets the output on terminal 7 if the instantaneous pin 6 voltage exceeds 0.50 Volts. The maximum flow through the source-drain electrodes of the MOS-FET transistors 82–85 is set by adjustable resistor 79.

Output regulation starts at the error amplifier transistor 75 with gain set by the combination of the adjustable resistor 80 and resistor 81.

The MOS-FET converter 62 consists as shown of a number of MOS-FET transistors 82, 83, 84, 85 (and so on) connected in parallel. The gate electrodes are as explained above controlled by a square wave from pin 7 of the control circuit 64. In the example shown the gate voltage should be some 8 volts to operate the MOS-FET transistors.

The current drain from the low DC voltage supply connected to terminals 60, 61 is some 17 Amperes in the example shown, the current being distributed among the individual transistors. The drain electrode of these transistors are intimately coupled to individual primary windings 86, 87, 88, 89 a.s.o. on a transformer 90. The MOS-FET transistors used are of the type having a very low internal resistance in the on-condition (a drain-source resistance lower than say 15 milliohms). One example of transistors suitable for this purpose is MOTOROLA 200 N 06.

The advantages of using a number of low power MOS-FET transistors instead of a single high power one, and individual transformer windings, are that the voltage drop across a single high power transistor would be too high compared to the low input voltage available, and that one larger primary winding would not easily follow the on-off switching of the transistor(s). In addition, high power MOS-FET transistors are more costly than a number of smaller ones.

Figure 7:
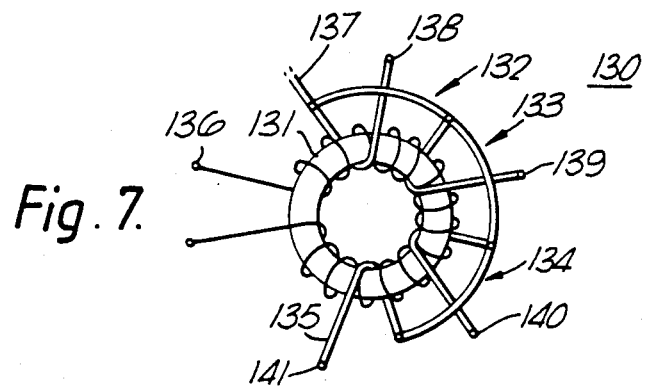
FIG. 7 shows schematically a preferred transformer configuration.

The transformer 90 should preferably have a toroidal ferrite core with the primary windings 86–89 distributed so as to interact with individual parts of a secondary winding 91. This is illustrated in FIG. 7.

In one example of this embodiment of the invention the input voltage from a galvanic cell of the type described was 0.5 Volts, with a current drain of 17 Amperes, whereas the output voltage was 10 Volts and the current through the load 92 was 0.5 Amperes.

Figure 6:
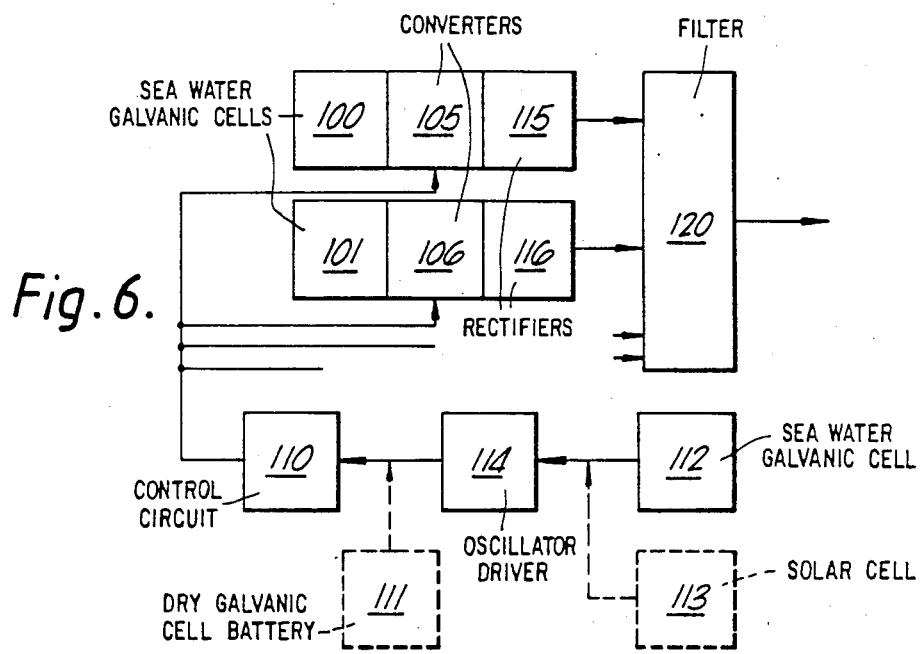
FIG. 6 shows in block form a modular power supply.

In FIG. 6 a modulized version of the power supply is shown. A number of sea water galvanic cells 100, 101 and so on are intimately coupled with individual converters 105, 106 and so on. The purpose of this construction is that when long life and high power are required of the power supply the sea water galvanic cell would be very bulky and difficulty would arise in connection with termination of leads on the cell. With the distributed version the sea water galvanic cell is preferably subdivided into several smaller and less bulky units. Termination problems are thereby also minimized. Furthermore, it is considered advantageous to make the leads from the cell to the converter as short as possible in order to reduce losses.

The plurality of cell-converter units 100/105, 101/106 and so on can be effectively controlled from a single control circuit 110. As mentioned above, the control circuit 110 may be initiated by a dry galvanic cell battery 111 or by a separate sea water galvanic cell 112 (or a solar cell 113) with a germanium oscillator driver 114 or the like.

The outputs from the converters 105, 106 and so on may be rectified in individual rectifiers 115, 116 and so on and combined to provide a common output signal in a filter 120. There may also be individual filters.

It should be noted that the duty cycle arrangement of the converters may be different. The modulized arrangement may be varied widely within the scope of the present invention.

In FIG. 7 is schematically illustrated one embodiment of the transformer 130. Four primary windings 132-135 are wound (one turn is shown only) in a displaced arrangement of a ferrite core 131 so as to interact with different parts of a secondary winding 136. One end of the primary windings is interconnected with a wire 137 whereas the other ends (138-141) are connected to individual MOS-FET transistors (not shown in this embodiment).

Figure 8:
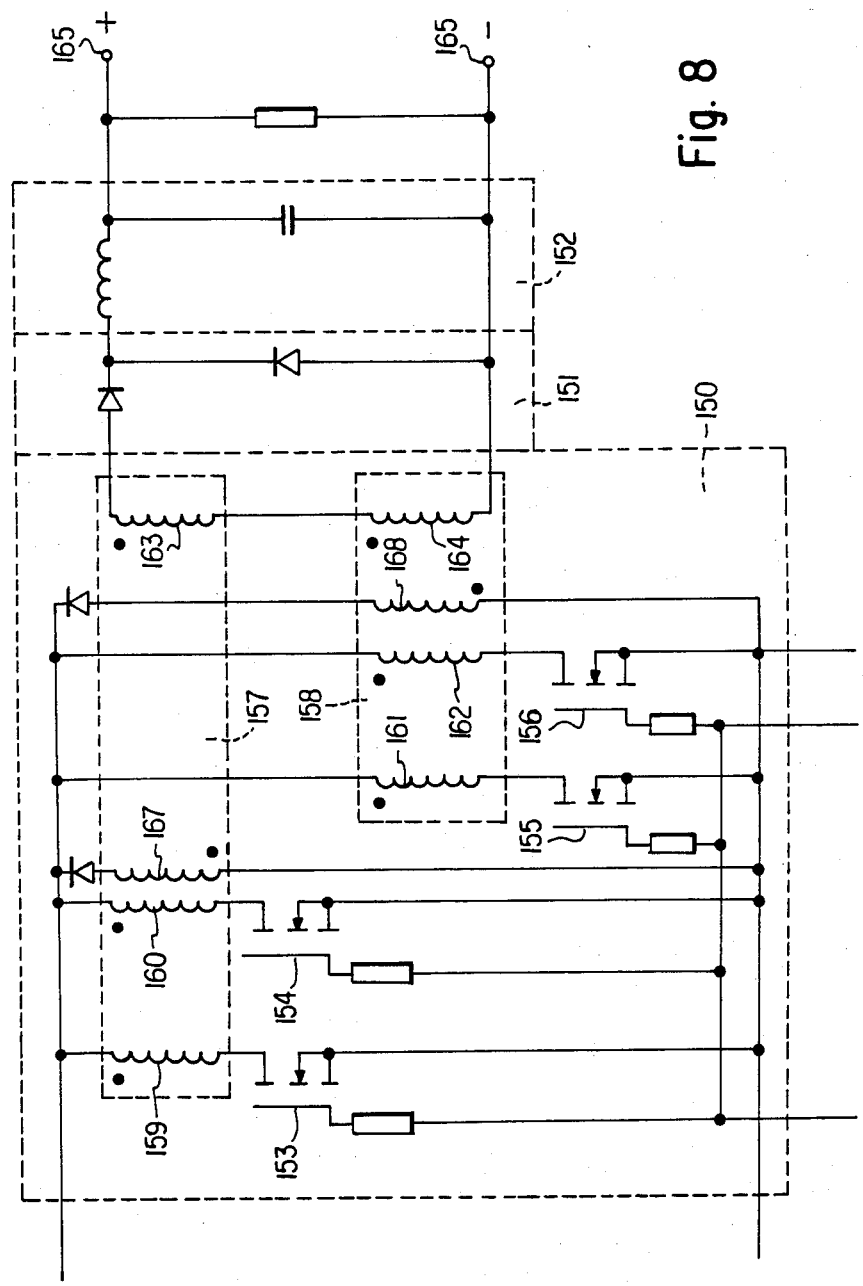
FIG. 8 shows an alternative embodiment of FIGS. 4 and 5.

Without departing from the principles of the present invention the DC/DC converter may be given an alternative design which is illustrated in FIG. 8. The purpose of this alternative embodiment is that of obtaining a higher output voltage. In this embodiment, a converter 150, a rectifier 151 and a filter 152 are substituted for the corresponding circuits 62, 67 and 68 in FIG. 5. The MOS-FET transistors in the converter are grouped such that they cooperate with two or more transformers. The drawing shows four transistors 153-154 cooperate with a transformer 157 and the transistors 155-156 cooperate with a different transformer 158. All of the transistors do however operate in parallel, as they receive the same control signal and as the outlet terminals of the transistors are interconnected via individual windings 159-162 constituting primary windings in the transformers 157-158.

Depending on the currents to be handled there may be more than two transistors in each group. There may also be more than two groups with a corresponding number of transformers. While the outlet terminals of the transistors 153-156 are interconnected via individual transformer windings 159-162, the outlet or secondary windings 163-164 of the transformers are connected in series in order to obtain a higher output voltage over the terminals 165-166. If each of the transformers produces a voltage of 12 volts, the two transformers connected in series will produce an output voltage of 24 volts.

FIG. 8 also shows demagnetizing coils 167-168, the purpose of which are to improve the on/off characteristics of the transistor circuits The above detailed description of embodiments of this invention must not be taken as a limitation on the scope of protection.

What is claimed is:

1. A power supply comprising:
  a DC/DC converter including
    at least two transistors connected in parallel, each having low drain-source resistance;
    a control circuit connected to each of said transistors to control the conductive state thereof, said transistors being controlled in parallel by a common control signal from said control circuit and exhibiting corresponding intervals of conduction, each of said transistors having output terminals; and
    a transformer coupler including similarly wound primary windings constituted by a plurality of windings interconnected with said output terminals.

2. The power supply of claim 1 wherein said transformer coupler includes at least two transformers, each of said transformers having at least one of said primary windings and a secondary winding, said secondary winding of one transformer being connected in series with said secondary winding of the other transformner.

3. The power supply according to claim 1 wherein each of said transformers includes a toroidal core on which the primary windings are arranged in parallel, and where the primary windings are displaced from each other to interact with different parts of said secondary windings.

4. The power supply according to claim 1 further comprising either one of a sea water galvanic cell or a solar cell as source for an input DC voltage which operates said transistors.

5. The power supply according to claim 2 further comprising a rectifier and a low pass filter which is connected to the secondary winding to form the output of each of said transformers for producing an output DC voltage.

6. The power supply of claim 4 further comprising a germanium transistor oscillator driver associated with said control circuit which is arranged to be initiated by the input DC voltage.

7. The power supply according to claim 1 further comprising an outlet for said power supply, any one of a primary or secondary cell or battery for driving said control circuit, short circuit and breakdown protecting means on the outlet of the power supply, and recharging means for the secondary cell or battery.

8. The power supply of claim 1 wherein said transistors include a plurality of MOS-FET transistor circuit assemblies, each of which is associated with either one of a sea water galvanic cell or a solar cell.

* * * * *